United States Patent
Hunt et al.

(10) Patent No.: US 10,656,046 B2
(45) Date of Patent: May 19, 2020

(54) ASEPTIC FILTER VENT VALVE AND PORT FOR INTEGRITY TESTING

(71) Applicant: EMD Millipore Corporation, Burlington, MA (US)

(72) Inventors: Stephen G. Hunt, Burlington, MA (US); Nicholas Landry, Burlington, MA (US); Martin Szyk, Burlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 173 days.

(21) Appl. No.: 15/520,082

(22) PCT Filed: Dec. 17, 2015

(86) PCT No.: PCT/US2015/066348
§ 371 (c)(1),
(2) Date: Apr. 19, 2017

(87) PCT Pub. No.: WO2016/109230
PCT Pub. Date: Jul. 7, 2016

(65) Prior Publication Data
US 2018/0275012 A1    Sep. 27, 2018

Related U.S. Application Data

(60) Provisional application No. 62/097,761, filed on Dec. 30, 2014.

(51) Int. Cl.
*G01M 3/28* (2006.01)
*B01D 65/10* (2006.01)
(Continued)

(52) U.S. Cl.
CPC ......... *G01M 3/2876* (2013.01); *B01D 61/243* (2013.01); *B01D 65/022* (2013.01);
(Continued)

(58) Field of Classification Search
CPC .. B01D 65/102; B01D 65/10; B01D 2273/18; B01D 65/104; B01D 35/30; G01N 2015/084
See application file for complete search history.

(56) References Cited

U.S. PATENT DOCUMENTS

| 4,881,176 A | 11/1989 | Kononov | |
| 5,353,630 A * | 10/1994 | Soda | B01D 65/102 73/38 |

(Continued)

FOREIGN PATENT DOCUMENTS

| CN | 102435224 A | 5/2012 |
| CN | 102062218 B | 9/2014 |

(Continued)

OTHER PUBLICATIONS

European communication dated Jul. 24, 2018 in corresponding European patent application No. 15875981.1.
(Continued)

*Primary Examiner* — David A Rogers
(74) *Attorney, Agent, or Firm* — Nields, Lemack & Frame, LLC

(57) ABSTRACT

The present disclosure relates to a filter capsule that supports direct integrity testing of an internal filter element. The filter capsule includes a filter housing having an inlet port, an outlet port, a passage running longitudinally between the inlet port and outlet port and holding a filter element, and an aseptic vent assembly. The filter housing also includes an integrity test assembly that can be used as a direct connection for integrity testing hardware, as opposed to upstream of the filter capsule. In one embodiment, the integrity test assembly comprises a body having a bore formed through its interior and a movable plunger within the bore. The plunger includes a handle to move the plunger between a closed position and an open position. Various seals between the
(Continued)

plunger and the bore form a fluid tight seal between various portions of the plunger and the bore.

20 Claims, 12 Drawing Sheets

(51) Int. Cl.
*B01D 65/02* (2006.01)
*B01D 61/24* (2006.01)
*F16J 15/00* (2006.01)
*F16K 1/46* (2006.01)

(52) U.S. Cl.
CPC .......... *B01D 65/104* (2013.01); *F16J 15/002* (2013.01); *F16K 1/46* (2013.01); *B01D 2201/167* (2013.01); *B01D 2273/18* (2013.01); *B01D 2313/13* (2013.01); *B01D 2313/16* (2013.01); *B01D 2313/18* (2013.01); *B01D 2313/58* (2013.01); *B01D 2313/90* (2013.01)

(56) References Cited

U.S. PATENT DOCUMENTS

| | | | |
|---|---|---|---|
| 5,468,388 A | | 11/1995 | Goddard et al. |
| 5,594,161 A | | 1/1997 | Randhahn et al. |
| 5,685,991 A | * | 11/1997 | Degen ................. B01D 65/102 210/500.41 |
| 6,360,914 B1 | * | 3/2002 | Frank ....................... F17C 1/00 222/182 |
| 6,527,146 B1 | * | 3/2003 | Tanny ..................... A61L 2/022 222/189.06 |
| 7,040,512 B2 | * | 5/2006 | Tanny ..................... A61L 2/022 222/189.06 |
| 7,273,550 B2 | | 9/2007 | Gutman et al. |
| 7,592,178 B2 | * | 9/2009 | Ding ................... B01D 65/102 422/122 |
| 7,927,316 B2 | | 4/2011 | Proulx et al. |
| 7,972,515 B1 | * | 7/2011 | Mangum .............. B01D 65/104 210/321.65 |
| 8,066,790 B2 | * | 11/2011 | Hutchinson ........... B01D 29/111 55/498 |
| 8,506,798 B2 | * | 8/2013 | Beulay ................... C12M 47/12 210/241 |
| 8,544,497 B2 | | 10/2013 | Hillier et al. |
| 8,579,871 B2 | * | 11/2013 | Proulx ................. A61M 39/10 251/319 |
| 9,072,996 B2 | * | 7/2015 | Jornitz .............. B01D 46/0086 |
| 9,482,351 B2 | * | 11/2016 | Proulx ................. A61M 39/10 |
| 9,508,970 B2 | * | 11/2016 | Jones ................. H01M 2/1241 |
| 9,682,335 B2 | * | 6/2017 | Lin ........................ B01D 35/30 |
| 2003/0159977 A1 | * | 8/2003 | Tanny ..................... A61L 2/022 210/90 |
| 2004/0129060 A1 | | 7/2004 | Grummert et al. |
| 2004/0191113 A1 | * | 9/2004 | Czajkowski ........... A61L 2/022 422/4 |
| 2005/0145559 A1 | | 7/2005 | Gutman et al. |
| 2006/0218991 A1 | * | 10/2006 | Baumfalk .......... B01D 46/0086 73/37 |
| 2007/0079649 A1 | | 4/2007 | Nauseda et al. |
| 2007/0106264 A1 | * | 5/2007 | Proulx ................. A61M 39/10 604/533 |
| 2007/0144949 A1 | * | 6/2007 | Husain ................ B01D 65/102 210/90 |
| 2008/0060419 A1 | * | 3/2008 | Albertini ............... A61M 1/168 73/40.7 |
| 2008/0245720 A1 | * | 10/2008 | Hutchinson ........... B01D 29/111 210/236 |
| 2009/0229671 A1 | * | 9/2009 | Hartnett ................ A61M 39/22 137/13 |
| 2011/0067485 A1 | * | 3/2011 | Grant ................... B01D 65/102 73/38 |
| 2011/0138936 A1 | * | 6/2011 | Collins ................ B01D 65/104 73/863.23 |
| 2011/0197989 A1 | * | 8/2011 | Proulx .................. A61M 39/10 141/1 |
| 2011/0253233 A1 | * | 10/2011 | Hillier ....................... F16K 1/12 137/561 A |
| 2011/0297604 A1 | * | 12/2011 | Bryan .................... B01D 29/41 210/232 |
| 2013/0199639 A1 | * | 8/2013 | Hartnett ................ A61M 39/22 137/565.11 |
| 2013/0312492 A1 | | 11/2013 | Hillier et al. |
| 2013/0334450 A1 | * | 12/2013 | Proulx .................. A61M 39/10 251/324 |
| 2014/0026989 A1 | * | 1/2014 | Hillier ....................... F16K 1/12 137/544 |
| 2014/0298893 A1 | * | 10/2014 | Laubstein ............ B01D 65/102 73/38 |
| 2015/0033828 A1 | * | 2/2015 | Li ........................... G01M 3/06 73/38 |
| 2015/0108050 A1 | * | 4/2015 | Maggiore ............ B01D 35/303 210/85 |

FOREIGN PATENT DOCUMENTS

| | | | | |
|---|---|---|---|---|
| EP | 0592066 B1 | * | 9/1997 | .......... B01D 65/102 |
| EP | 0582822 B1 | * | 4/1998 | .......... B01D 65/102 |
| EP | 1499383 A1 | | 1/2005 | |
| EP | 2425886 B1 | * | 6/2016 | ......... B01D 46/0086 |
| JP | 4-348252 A | | 12/1992 | |
| JP | 6-508442 A | | 9/1994 | |
| JP | 2001-510088 A | | 7/2001 | |
| JP | 2002-320829 A | | 11/2002 | |
| JP | 2011-94799 A | | 5/2011 | |
| JP | 2011-231933 A | | 11/2011 | |
| WO | 03/090843 A1 | | 11/2003 | |

OTHER PUBLICATIONS

ASTM International, Designation D 6908-03, "Standard Practice for Integrity Testing of Water Filtration Membrane Systems", Jun. 30, 2003.

International Search Report and Written Opinion dated Feb. 25, 2016 in corresponding PCT application No. PCT/US15/66348.

"Filter Integrity Testing," BioProcess Resources LLC, http://www.bioprocessresources.com/servicelist/information/filterintegritytesting, accessed Oct. 16, 2014.

Czermak et al., "Automated Integrity Testing of Hydrophobic Filters Based on Water Intrusion Measurements: Comparative Analysis of a Refilling Continuous-Flow and a Pressure-Decay Batch Device," European Journal of Parenteral Sciences, vol. 5, pp. 59-63, 2000.

Landon et al., "Bridging the Gap: A Case Study in the Validation of Hybrid Connectors," Millipore Corporation, Jun. 2004.

"Drug Product-Based Integrity Testing Establishing a Product/Filter Test Minimum Value," Millipore Corporation, Dec. 2013.

"Millipore Steam Sterilization & Integrity Testing Procedures," Millipore Corporation, May 2003.

"Preparation, Use, and Integrity Testing of Pall Ultipor VF DV20 Filter Cartridges and Capsules," Pall Corporation, 2007.

"Novasip Capsules with Emflon PFR Membrane," Pall Corporation, 2012.

Japanese communication, with English translation, dated Aug. 7, 2018 in corresponding Japanese patent application No. 2017-534285.

Xiaodong et al., Mechanical and Electrical Information, Issue 2, Jan. 15, 2009.

Chinese communication, with English translation, dated Feb. 19, 2019 in corresponding Chinese patent application No. 201580071974.1.

* cited by examiner

ASEPTIC FILTER VENT VALVE AND PORT FOR INTEGRITY TESTING

This application claims priority of U.S. Provisional Application Ser. No. 62/097,761 filed Dec. 30, 2014, the disclosure of which is incorporated herein by reference.

FIELD OF THE DISCLOSURE

The present disclosure generally relates to filtration of gas and liquid media. In particular, the present disclosure relates to a filtration device comprising an integrated aseptic valve and port for integrity testing.

BACKGROUND

High purity filtration of aqueous media, such as in the fields of biotechnology, chemistry, electronics, pharmaceuticals, and the food and beverage industries requires the use of sophisticated filter modules that are not only capable of a high degree of separation, but that will tend to prevent contamination of the environment, of the medium to be filtered, and of the resulting filtrate. This is designed to prevent unwanted, often dangerous organisms, such as bacteria or viruses, as well as environmental contaminants, such as dust, dirt, and the like from entering into the process stream and end product. Similarly, filter capsules help to prevent contamination of a highly validated clean room due to exposure from the contents of the process stream. To ensure sterility, it would be desirable to have a completely sealed system. However this is not always possible with the processes that take place in production.

To ensure sterility of the filtrate, filter modules must maintain their integrity throughout the filtration process. Accordingly, integrity testing of sterilizing filters is a fundamental requirement of critical process filtration applications in the pharmaceutical industry. General guidelines require integrity testing of filter modules after filtration, and recommend integrity testing of filter modules prior to use. Typically this testing is initially performed after sterilization to ensure that the filter is not damaged; accordingly, care must be taken to ensure that sterility of the filter, and thus the filtrate, is not compromised. Post-processing, the filter integrity test may be performed again either in situ or separated from the assembly and tested in a separate room to determine whether the filter was compromised during use. This information can be used to alert operators to a potential problem immediately after processing, and to quickly take corrective action. Further, FDA guidelines require that integrity testing documentation be included with batch product records.

There are a variety of methods of integrity testing, including the diffusion test and the pressure hold test. The diffusion test measures the rate of gas transfer through a filter to be tested. At differential gas pressures below the bubble point, gas molecules migrate through water-filled pores of a wetted membrane following Fick's Law of Diffusion. The gas diffusional flow rate for a filter is proportional to the differential pressure and the total surface area of the filter. At a pressure approximately 80% of the minimum bubble point, the gas which diffuses through the filter membrane can be measured to determine a filter's integrity. A diffusional flow reading exceeding a value stated by the manufacturer indicates a variety of problems, including an incorrect temperature, wrong pore size, incompletely wetted membrane, non-integral membrane or seal, or inadequate stabilization time. The pressure hold test, also known as the pressure decay or pressure drop test, is a variation of the diffusion test. In this test, a highly accurate gauge is used to monitor upstream pressure changes due to gas diffusion through the filter. Because there is no need to measure gas flow downstream of the filter, any risk to downstream sterility is eliminated.

Typically, integrity testing is performed with specialized integrity testing hardware. Examples include the Integritest® 4 Series Automated Filter Integrity Test Instrument (commercially available from EMD Millipore Corporation) and the Sartocheck® line of filter integrity testing systems (commercially available from Sartorius Corporation). To perform integrity testing of a filter module installed in an assembly, an end user would attach the integrity testing hardware to a secondary aseptic connection located upstream of the filter capsule. To ensure that no contaminants are introduced, the secondary aseptic connection may comprise a Lynx ST Valve (commercially available from EMD Millipore Corporation) and an aseptic phobic filter between the capsule filter and the integrity testing equipment. Using clamps or other means, the end user isolates the desired integrity testing flow path from other components of the assembly and activates the integrity testing equipment, which performs the integrity test and provides the result.

However, integrity testing is sensitive to a variety of factors related to the composition and complexity of an assembly. A typical flow path for integrity testing on an assembly may include various tubing, flex points, T-connections, gaskets, and other components between the integrity test hardware and a filter capsule. Integrity testing may stress these components, leading to false integrity test failures that are a result of loose connections or compression. Thus, it may not be clear whether the integrity test is testing the filter or the isolated flow path. Further, including new connections to support integrity testing hardware presents new failure points and increases the complexity of the system. Moreover, attaching integrity testing hardware to components downstream of the filter increases the likelihood of contamination.

In light of the above, a need exists for an improved device, system, and method for performing integrity testing of filter assemblies.

SUMMARY

The problems of the prior art are addressed by a novel design for a filter capsule containing a filter element. The filter capsule includes an integrity test assembly comprising an aseptic port and valve on the upstream side of the capsule that can be used to perform an integrity test of an internal filter element. In this way, integrity testing is performed as close as possible to the filter element, and problems associated with performing integrity testing farther upstream or downstream of the filter are minimized or eliminated. Further, the integrity test assembly is an aseptic connection that can withstand multiple actuations without compromising sterility.

In one embodiment, a filter capsule that supports direct integrity testing of an internal filter element includes a filter housing having an inlet port, an outlet port spaced from the inlet port, a passage or housing volume between the inlet port and the outlet port and containing a filter element. The filter capsule further includes a vent assembly and an integrity test assembly. In some embodiments, the vent assembly and integrity test assembly present an aseptic connection. In certain embodiments, the integrity test assembly further comprises a body having a bore formed through at least a portion of its interior and having a cam slot. A movable plunger contained with the bore includes a cam contained with the cam slot and an actuator such as a handle to move the plunger between a closed position and an open position. One or more seals are located between the plunger and the bore to form a fluid tight seal. In certain embodiments, there are multiple seals, including a shut-off seal, an outside seal, and a sterility seal.

In certain embodiments, a disposable or single use filtration assembly includes an integrity testing device, a source of fluid to be processed, a holding container, and a filtration device. The filtration device includes an inlet port in fluid communication with said source of fluid and an outlet port in fluid communication with said holding container. The filtration device further includes a filter element, an aseptic vent port, and an aseptic integrity test assembly. In some embodiments, the integrity test assembly includes a body having a bore formed through a portion of its interior, a plunger within the bore, an actuator such as a handle to move the plunger between a closed position and an open position. The integrity test assembly further includes a shut-off seal, an outside seal, and a sterility seal. Integrity testing of the filtration device and filter element may be performed by attaching the integrity testing hardware to the integrity test assembly and then actuating the integrity test assembly.

In yet another embodiment, a method for performing an integrity test of a filter element via a port of a filter capsule includes attaching a gas line to an integrity test assembly on a filter capsule, pressuring the filter capsule, measuring a resulting pressure change, and determining whether the pressure change indicates that a filter contained within the filter capsule has been compromised. In one embodiment, the pressure change is measured downstream of the filter element; in certain embodiments, the pressure change is measured upstream.

BRIEF DESCRIPTION OF THE DRAWINGS

For a better understanding of the present disclosure, reference is made to the accompanying drawings, which are incorporated herein by reference and in which.

DETAILED DESCRIPTION

Figure 1:
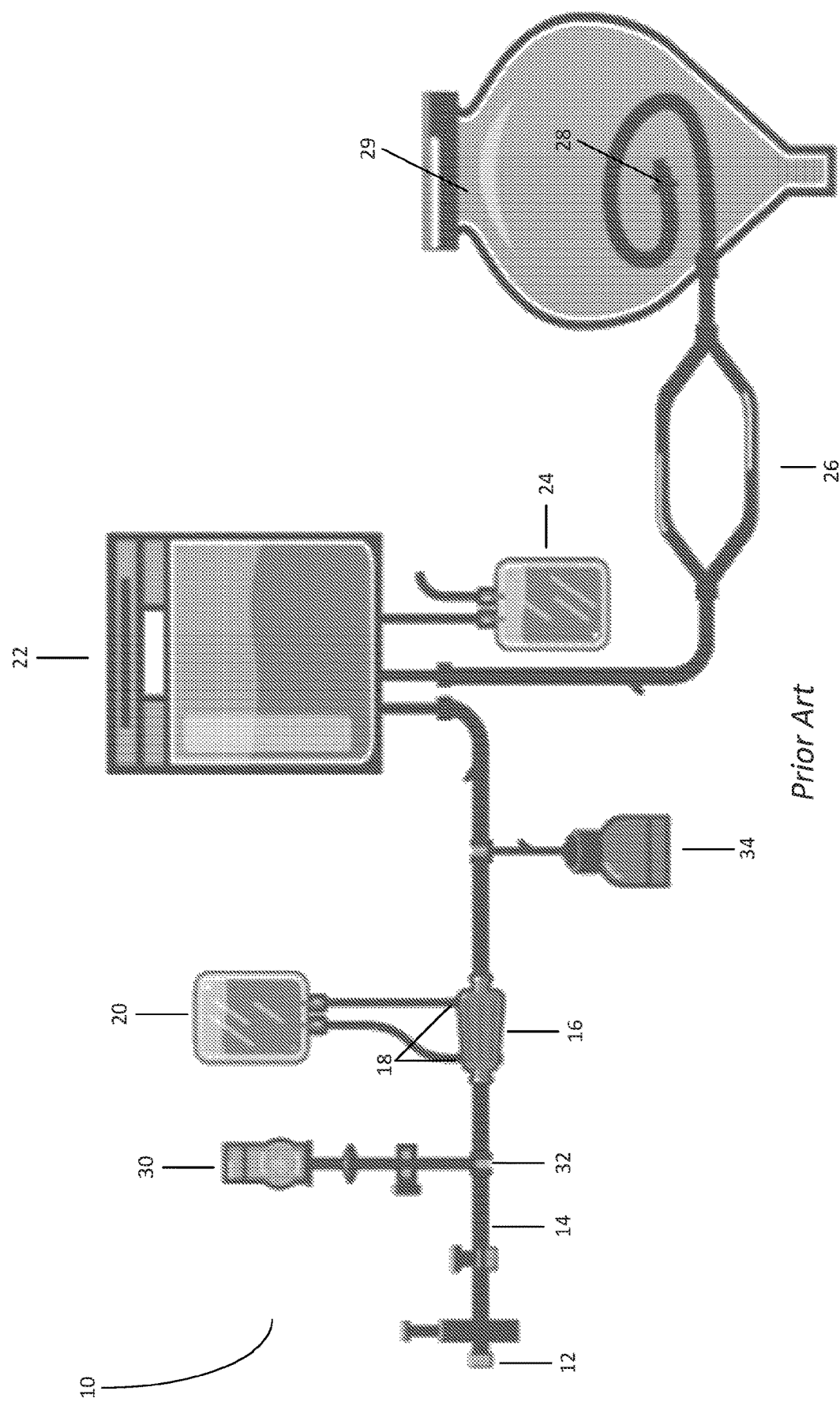
FIG. 1 is a diagram of a filtration assembly.

FIG. 1 illustrates an example of a filtration assembly 10 for aseptically processing a fluid solution. The filtration assembly 10 may either be disposable (i.e., single use) or reusable. The filtration assembly 10 includes a secure sterile connection 12 for attachment to a container holding a solution to be processed. Once the sterile connection 12 is actuated, solution flows through tubing 14 or the like to a filter capsule 16. In this example, the filter capsule 16 contains a sterilizing filter that effectively removes viruses, bacteria, and any other contaminants from the solution. For example, the filter capsule 16 may be an Opticap disposable capsule sterilizing filter, commercially available from EMD Millipore Corporation. Excess gas and liquid may be vented or sampled through vent valves 18 on the filter capsule, and stored in a venting container such as bag 20. Filtrate then proceeds to a sterile holding container such as bag 22. The filtrate may also be sampled by a sampling container such as bag 24. Finally, filtrate proceeds to a dosing loop 26 for a pump (not shown), such as a peristaltic pump, and to a final connection 28. The final connection 28 may be surrounded by a protective bag 29, which helps to ensure that the final connection 28 does not become contaminated prior to being transferred to a sterile filling area for further processing.

As noted above, to ensure sterility of the final filtered product, sterilizing filters must be integrity tested after processing. In one example, to perform an integrity test of the filter capsule 16, a gas line 30 is positioned in fluid communication with the tubing 14 upstream of the filter capsule 16 through a secondary aseptic connection 32. To ensure sterility, the secondary aseptic connection 32 may include an aseptic phobic filter and a Lynx ST valve (commercially available from EMD Millipore Corporation) or the like. A measurement device is then positioned upstream of the gas line 30, a bag 34 is placed downstream of the filter to capture excess air, gas, and liquid, and a desired flow path starting from gas line 30, to the filter capsule 16, and ending at the bag 34 is isolated using clamps or other means. The gas line 30 is activated and deactivated after a period of time, and a decay in pressure over time is measured by the measurement device. The resulting data is compared to known acceptable values for the filer element contained within the filter capsule 16. If the integrity test indicates that the filter element has not been compromised, then it can be safely assumed that the filtrate to be dispensed by the final connection 28 is sterile.

Figure 2:
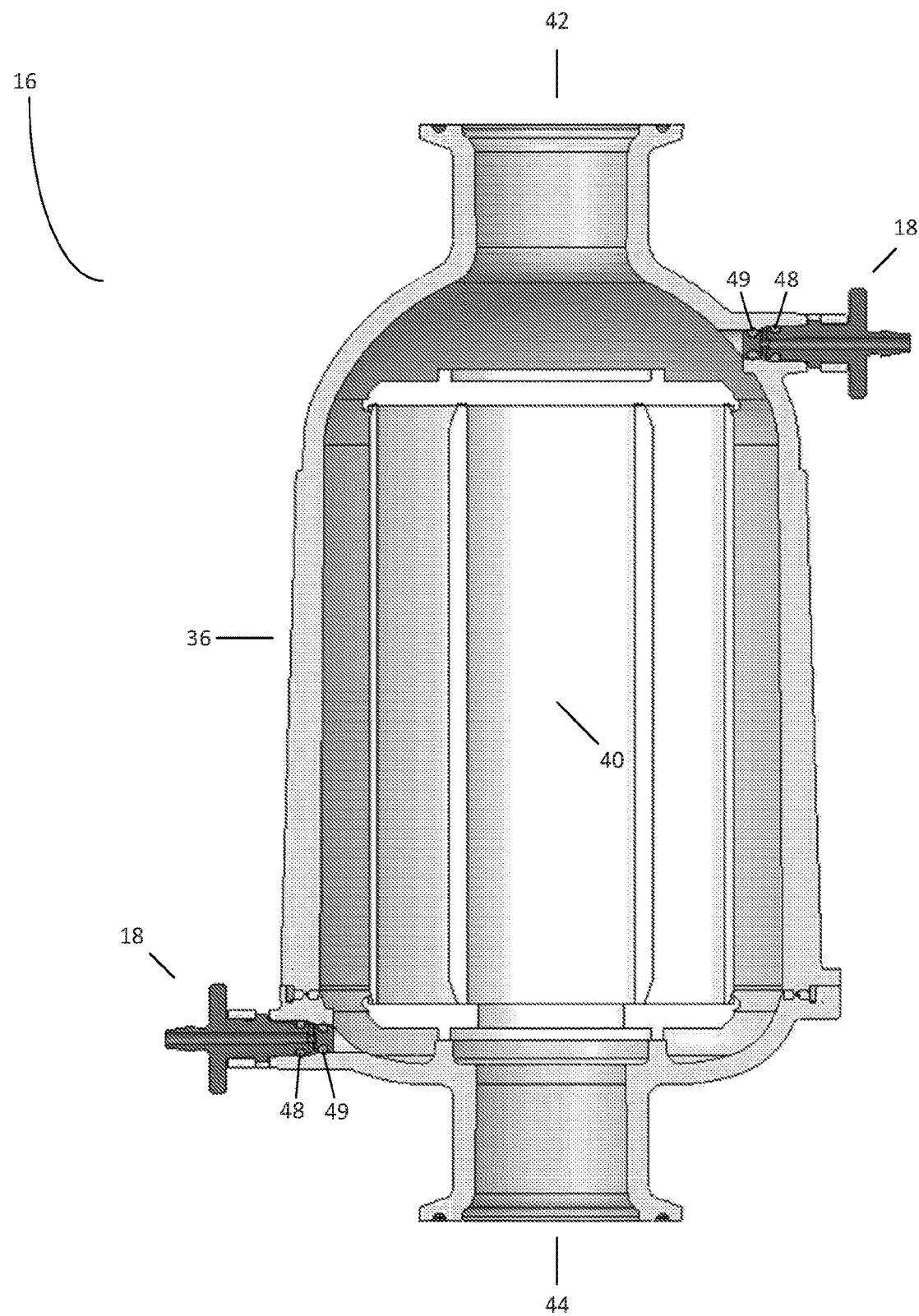
FIG. 2 is a cross-sectional view of a filter capsule.

Conventional filter capsules, and in particular the vent ports, are prone to issues. FIG. 2 provides a cross-sectional view of the filter capsule 16 of FIG. 1. The filter capsule 16 comprises a housing 36 having an inlet port 42 and an outlet port 44 spaced from the inlet port 42. Within the housing 36 is a housing volume comprising a passage running longitudinally between the inlet port 42 and outlet port 44. A filter element 40 is housed within the housing volume and is sealed to the outlet port 44, such that a fluid entering the inlet port 42 must pass through the filter element 40 before exiting the outlet port 44, thus filtering and sterilizing the fluid downstream of the filter capsule 16. Excess gas and fluid may be vented or sampled through either of vent valves 18, each of which includes two seals, an exterior seal 48 and an interior seal 49, to prevent external contamination. However, the vent valves 18 are not intended for multiple actuations, and may break after repeated use. The vent valves 18 are also prone to accidental contact with exterior surfaces, and may thus become contaminated. For example, contact with exterior surfaces may lead to contamination of the exterior seal 48. As the vent valve 18 is actuated, the exterior seal 48 rides within the body of the vent valve 18 and contaminates the interior surface, potentially leading to contamination of the interior seal 49. Contamination of the interior seal 49 leads to contamination of the filter environment and process stream. Contact with exterior surfaces may also cause the vent valve 18 to break if sufficient force is encountered.

Figure 3:
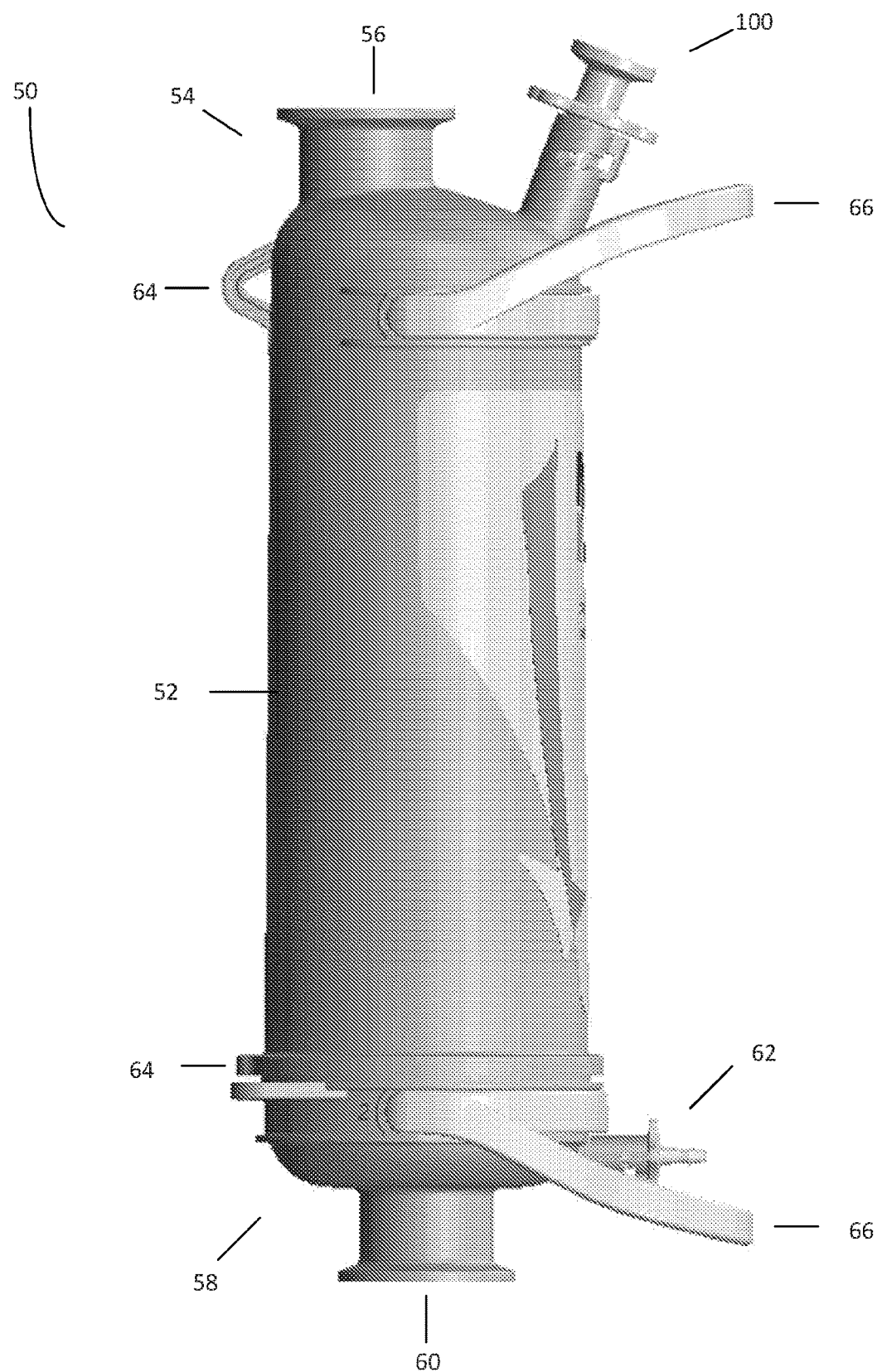
FIG. 3 is a side view of a filter capsule according to an embodiment of the disclosure.

FIG. 3 illustrates a filter capsule 50 according to one embodiment of the present disclosure. The filter capsule 50 comprises a housing 52, inlet housing 54 with an inlet port 56, outlet end cap 58 with an outlet port 60, and a vent assembly 62. In certain embodiments, the housing 52 is generally cylindrical to prevent an uneven distribution of pressure within. In use, the inlet port 56 and outlet port 60 are connected to a filtration assembly (such as that shown in FIG. 1) and used to filter the product from a fluid container to remove viruses, bacteria, or other contaminants, for example. The vent assembly 62 may be used to vent the filter capsule or sample the fluid therein. In some embodiments, the vent assembly 62 is aseptic. Further, in certain embodiments, the housing 52 is formed from molded plastic. However, in other embodiments, stainless steel may be used.

In this embodiment, the outlet end cap 58 is thermally sealed to the housing 52. However, in certain embodiments, the outlet end cap 58 and housing 52 may comprise a single component. Similarly, in this embodiment, the inlet housing 54 is molded together with the housing 52; however, in certain embodiments, the inlet housing 54 and housing 52 may be separately formed and then bonded together. Various combinations are possible within the scope of the disclosure. Further, while the filter element 40 of this embodiment is heat sealed to the outlet end cap 58, in certain embodiments the filter element 40 may be a removable and replaceable element. Still other embodiments include housings 52 comprising steel or other materials that allow for a reusable, as opposed to a single-use, filter capsule 50.

In comparison to the filter capsule 16 of FIGS. 1-2, the filter capsule 50 may include several additional components. In certain embodiments, the housing 52 includes feet 64 connected to the housing near the inlet housing 54 and outlet end cap 58. Each foot 64 can function as a resting point for the filter capsule 50 when it is placed horizontally on a surface, thus stabilizing the filter capsule 50 and preventing accidental or unwanted movement. In this embodiment, the feet 64 comprise a looped member and therefore may also be used to fasten or otherwise secure the filter capsule 50 within an assembly. The filter capsule 50 may also include a handle 66 at each end of the housing 52, which can be used for manipulating and transporting the filter capsule 50 but also protects the filter capsule and ports from accidental contact with exterior surfaces, thus helping to prevent contamination.

Additionally, in certain embodiments, the filter capsule 50 includes an integrity test assembly 100 formed in the inlet housing 54 near the inlet port 56. Like the vent assembly 62, the integrity test assembly 100 can be used for venting and sampling the contents of the filter capsule 50 prior to filtration. Further, the integrity test assembly 100 may be used as a direct aseptic connection that facilitates a variety of integrity test methods, such as air/water diffusion, bubble point, and/or water intrusion tests. When actuated to an open position, the integrity test assembly 100 may be connected to integrity testing hardware, such as a gas line. When the integrity test is complete, the integrity test assembly 100 may then be closed and the hardware removed, without impacting sterility of the product within. Thus, the integrity test assembly 100 provides a direct aseptic connection to a filter capsule that can be leveraged for integrity testing, venting, or sampling. Further, the integrity test assembly 100 reduces the integrity testing flow path to nearly zero by providing an aseptic connection directly to the filter element 40 itself.

In this embodiment, the integrity test assembly 100 is formed as a part of the inlet housing 54. Thus, the integrity test assembly 100 is an integral component of the filter capsule 50. Attempting to remove the integrity test assembly 100 from the filter capsule 50 will irreversibly damage or contaminate the filter capsule 50, thus rendering the filter capsule 50 unsuitable for use within a filtration assembly. However, in certain embodiments, the integrity test assembly 100 may be removable.

Figure 4A:
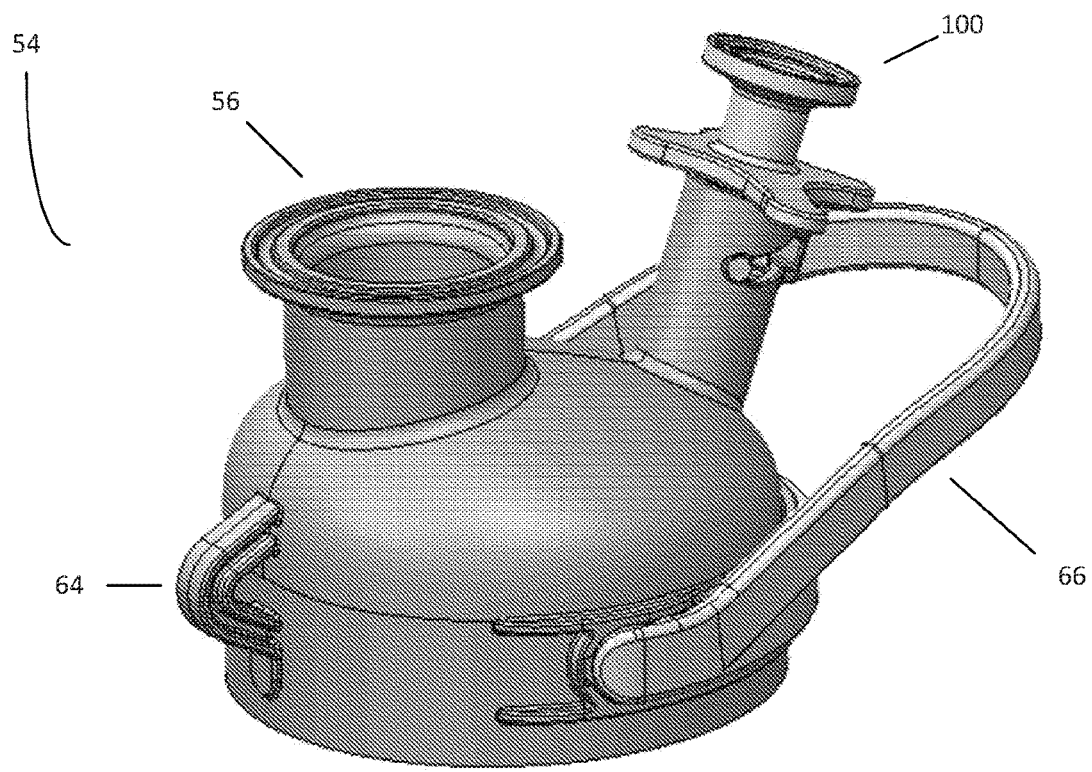
FIGS. 4A-B are perspective views of an inlet housing including an integrity test assembly.
Figure 4B:
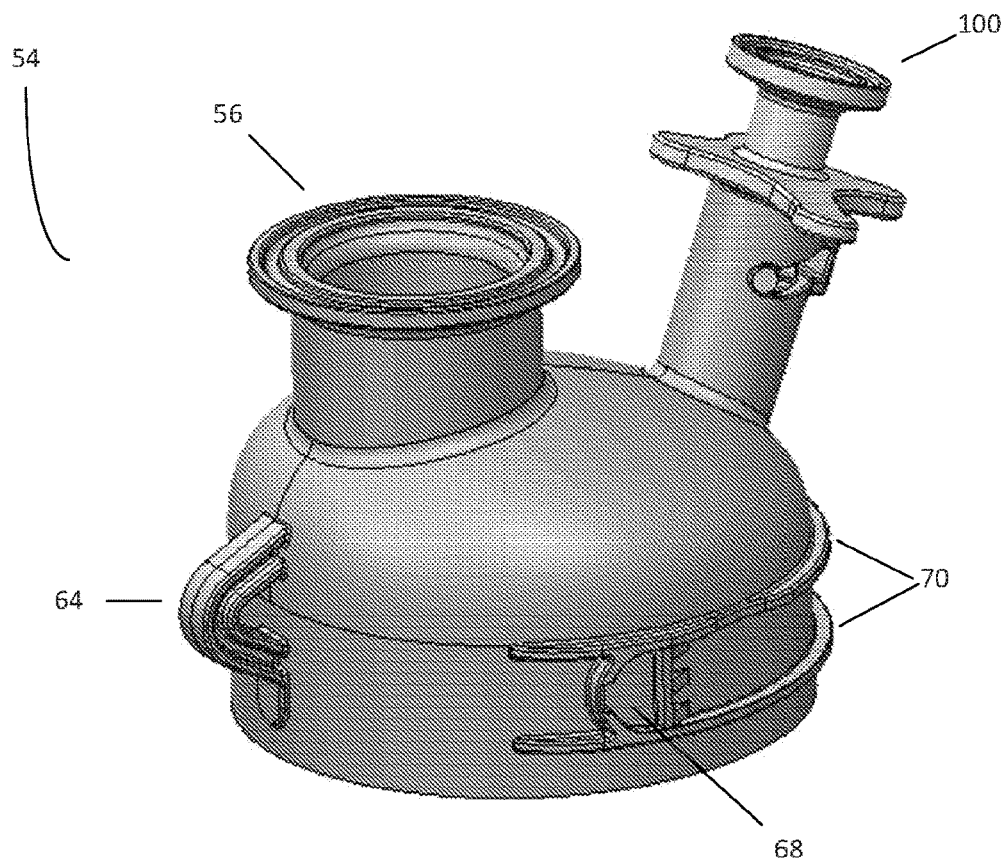

FIGS. 4A-B illustrate an embodiment of an inlet housing 54 of the filter capsule 50 in further detail. In these views, only the inlet housing 54 containing the inlet port 56, integrity test assembly 100, foot 64, and handle 66 is shown. While this view shows the inlet housing 54 separate from the housing 52, in this embodiment the inlet housing 54 and housing 52 are comprised of a single component. However, in certain embodiments, the inlet housing 54 may be a separately formed and removable component.

As shown in FIG. 4A, the handle 66 is connected to each side of the filter capsule 50. The handle 66 serves several purposes. For example, the handle 66 can be used to manipulate or install the filter capsule 50 in a filtration assembly (such as the assembly of FIG. 1) without accidental contact with the integrity test assembly 100, thus helping to maintain sterility. The handle 66 also protects the integrity test assembly 100 from accidental contact with outside components, or if the filter capsule 50 is inadvertently dropped. Further, the handle 66 can also be used as a foot to support the filter capsule 50 when the filter capsule 50 is placed horizontally. For example, if the filter capsule 50 is placed on its side or is knocked over when initially standing on its feet 64, the filter capsule 50 will come to rest on the handle 66, rather than on the integrity test assembly 100.

However, in some situations, the handle 66 may interfere with closely situated components within an assembly, and thus be an unwanted component. Accordingly, in certain embodiments, the handle 66 may be omitted from the filter capsule 50. However, in certain embodiments, as shown in FIG. 4B, the handle 66 may be a separately formed and removable element. In this case, the handle 66 may releasably snap onto the inlet housing 54 via a handle notch 68 and between guiding ridges 70. The handle notch 68 and guiding ridges 70 retain the handle 66 in a desired position. In the embodiment shown, the guiding ridge 70 tapers inwardly near the receiving notch so as not to interfere with the graspable portion of the handle 66. In some embodiments, the handle 66 may then be removed by urging the edges of the handle 66 away from the handle notch 68. Accordingly, the handle 66 may be repeatedly removed and reattached to the inlet housing 54.

However, in certain embodiments, the handle 66 may not be removable. Rather, in these embodiments, the handle 66 is provided separately from the filter capsule 50 and may only be snapped in place and secured to the filter capsule 50 if so desired by the end user. In the non-removable embodiment, attempted removal of the handle 66 will result in breakage of either the handle 66 or the inlet housing 54 or both. For example, one means of permanently attaching or securing the handle 66 to the inlet housing 54 is by a heat stake rivet.

Figure 5A:
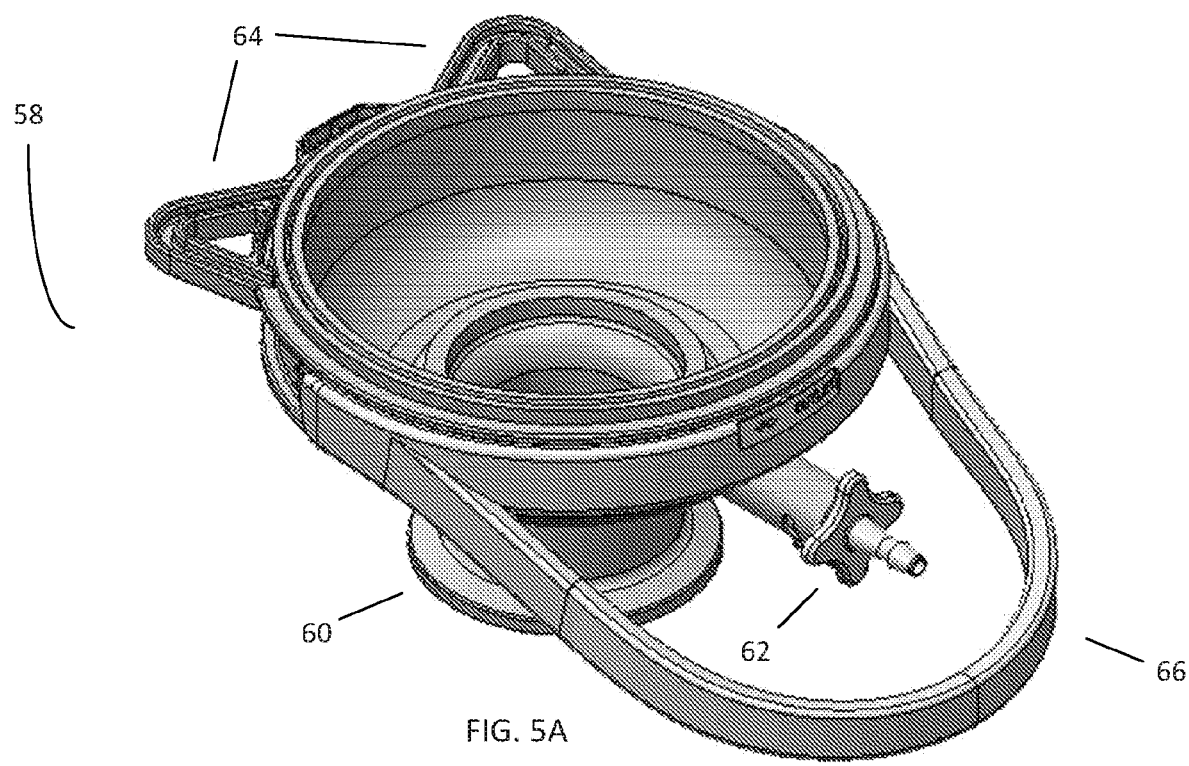
FIGS. 5A-B are perspective views of an outlet end cap including a vent port.
Figure 5B:
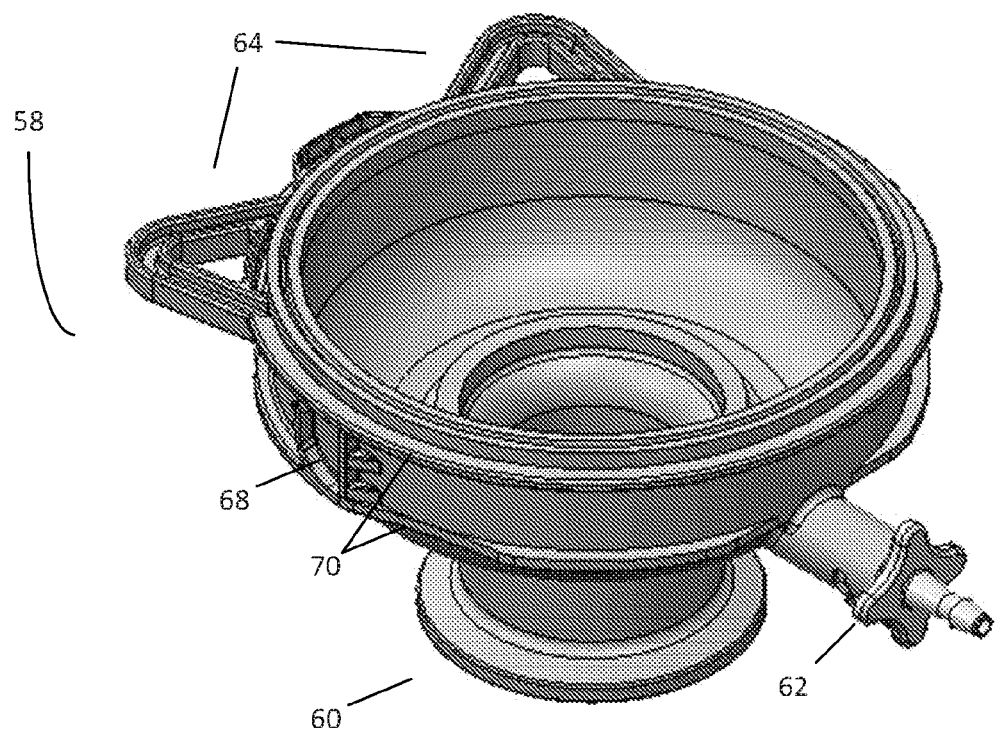

Similarly, FIGS. 5A-B illustrate an embodiment of an outlet end cap 58 shown separated from the housing 52. The outlet end cap 58 has two feet 64 in comparison to the single foot 64 of inlet housing 54; however, any number of feet 64 may be used for either component. The outlet end cap 58 also features a handle 66 that may be removable or otherwise attachable and reattachable via a handle notch 68 and guiding ridges 70. The guiding ridge 70 tapers inwardly near the handle notch 68 so as not to interfere with the graspable portion of the handle 66. In this embodiment, as shown, the handle 66 protects the vent assembly 62.

Figure 6:
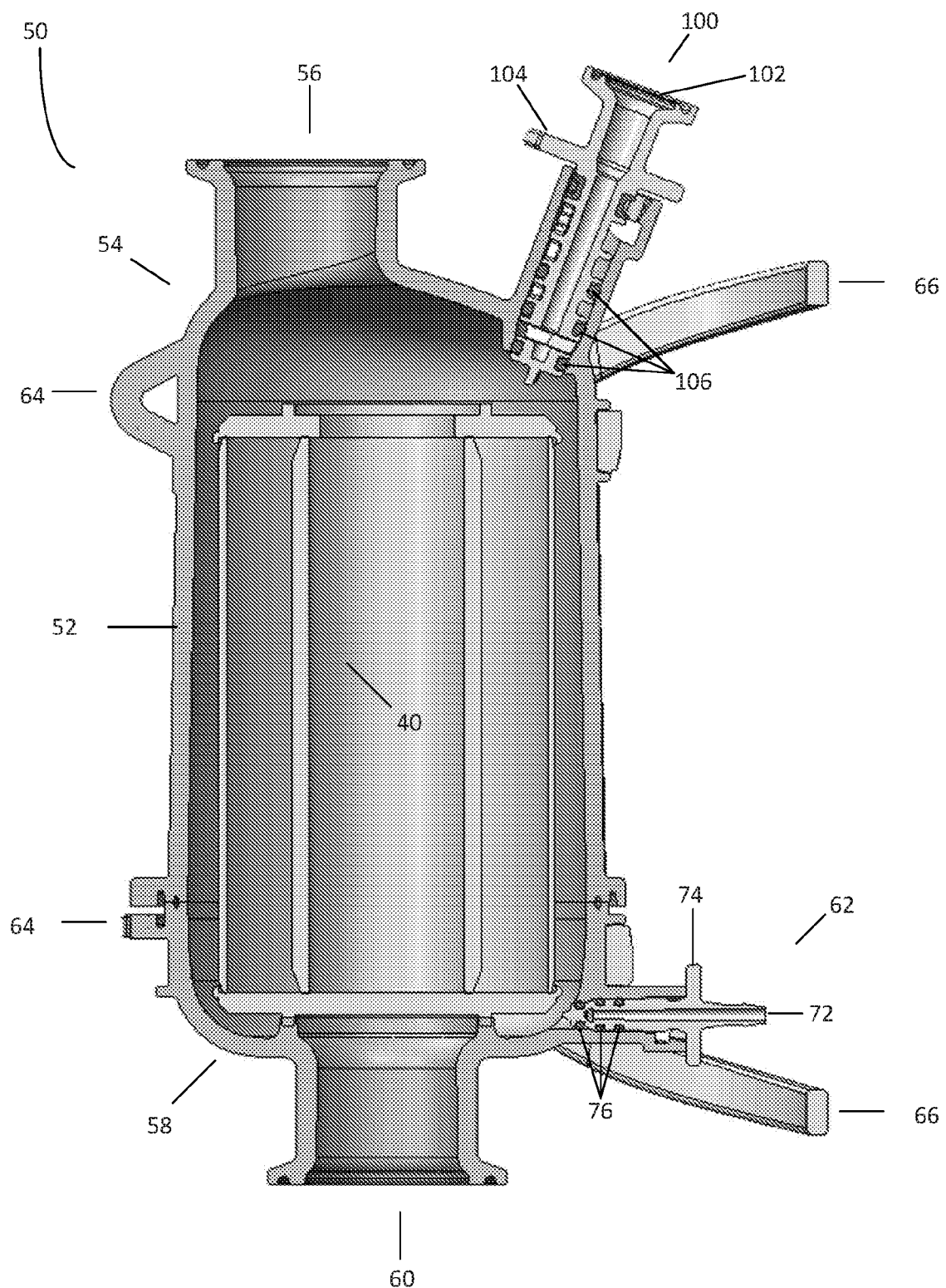
FIG. 6 is a cross-sectional view of the filter capsule of FIG. 3.

FIG. 6 illustrates a cross-sectional view of an embodiment of a filter capsule 50. Similar to the filter capsule 16 of FIGS. 1-2, within the filter capsule 50 is a filter element 40. In certain embodiments, the filter element 40 is sealed to the outlet port 60 of the outlet end cap 58, such that a fluid entering the inlet port 56 from upstream must pass through the filter element 40 before exiting through the outlet port 60, thus filtering the fluid. The filter element 40 may comprise any kind of filter, including pleated filters, hydrophobic filters, hydrophilic filters, or sterilizing filters. The vent assembly 62 and integrity test assembly 100 may have a similar design, and each includes a connection 72, 102; a connector actuator such as a handle 74, 104; and one or more seals 76, 106. In certain embodiments, the connection 72 on the vent assembly 62 is a barb connection, which may be attached to plastic tubing connected to a venting or sampling container such as a bag. To vent or sample the contents of the filter capsule 50, the vent assembly 62 is actuated such as by rotating the connector actuator or handle 74, thus opening the vent assembly 62. The integrity test assembly 100 has a larger diameter than the vent assembly 62, so as to provide sufficient flow characteristics necessary for integrity testing. In this embodiment, the connection 102 on the integrity test assembly 100 is a TC connection, which may be attached to a gas line, integrity testing hardware, or a venting or sampling bag. Similar to the vent assembly 62, the integrity test assembly 100 may be actuated by rotating the handle 104. The one or more seals 76, 106 on each port ensure sterility of the contents of the filter capsule 50 despite multiple actuations, making each port aseptic. Further, while in this embodiment the vent assembly 62 uses a barb connection and the integrity test assembly 100 uses a TC connection, various connections are within the scope of the disclosure. For example, in certain embodiments, Luer connections or other forms of connections may be used in either the vent assembly 62 or integrity test assembly 100.

In certain embodiments, an integrity test assembly 100 is provided on both the inlet housing 54 and outlet end cap 58. Alternately, the outlet end cap 58 may have an integrity test assembly 100, and the inlet housing has only a vent assembly 62. Either the integrity test assembly 100 or vent assembly 62 may also be present elsewhere on the housing 52 or on an assembly. For example, an integrity test assembly 100 and/or vent assembly 62 may be located downstream of the filter capsule 50. As noted previously, the integrity test assembly 100 is an integral component of the filter capsule 50 and may not be removed. However, in certain embodiments, the integrity test assembly 100 may be removable. Various embodiments, locations, and numbers of the integrity test assembly 100 and vent assembly 62 are within the scope of the disclosure.

Figure 7:
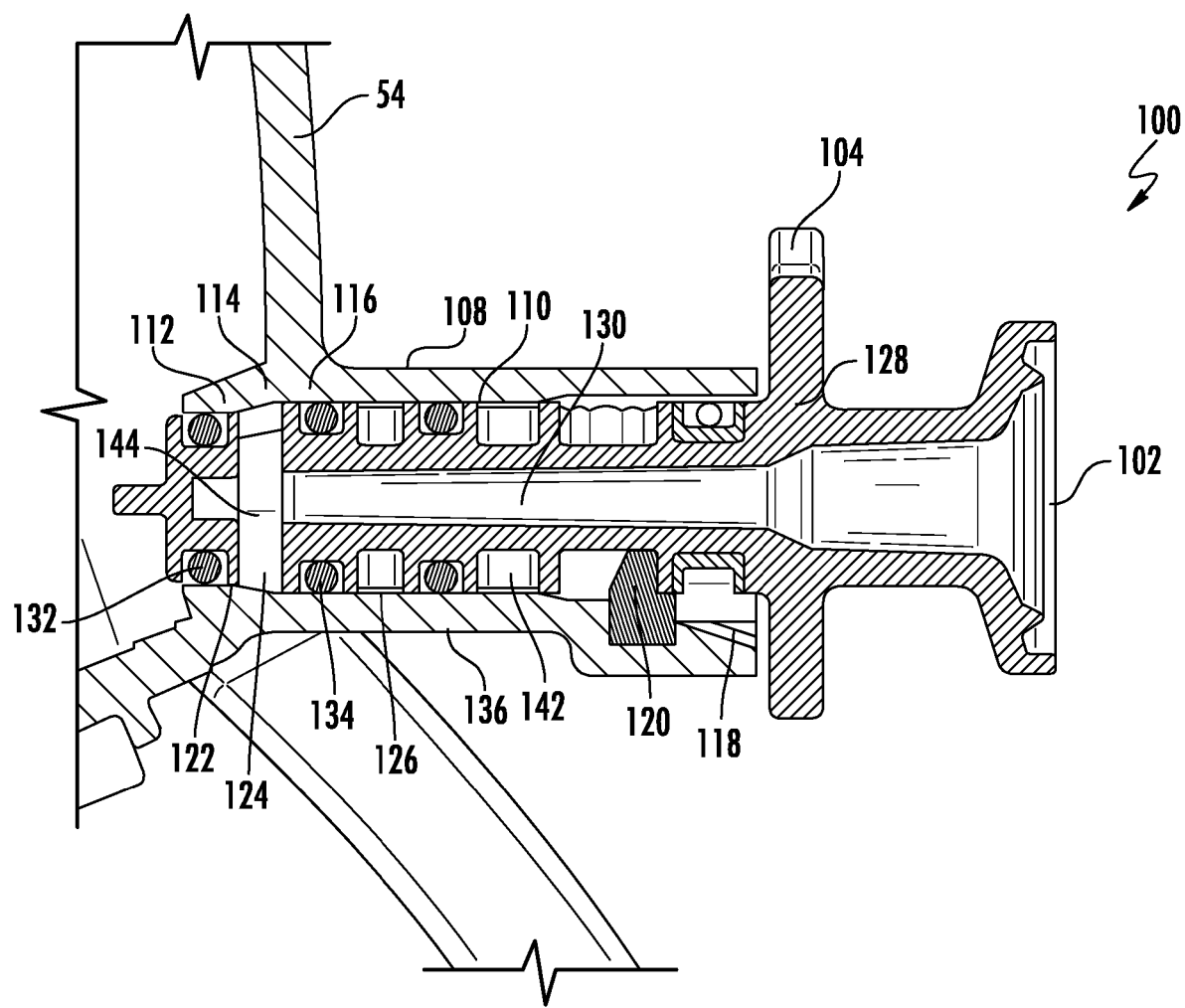
FIG. 7 is a cross-sectional view of an integrity test assembly according to the disclosure in the closed position.
Figure 8:
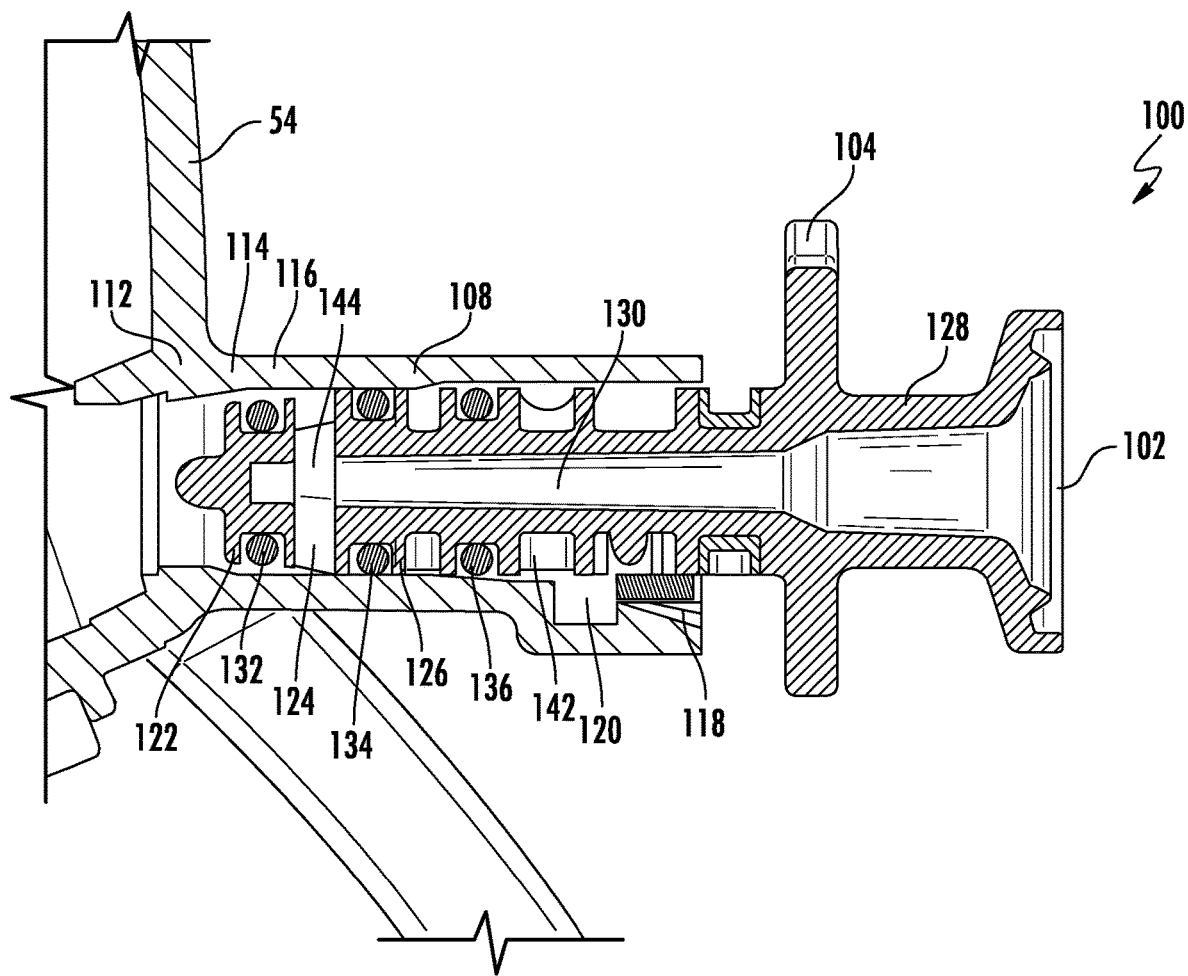
FIG. 8 is a cross-sectional view of an integrity test assembly according to the disclosure in the open position.

FIGS. 7-8 illustrate cross-sectional views of certain embodiments of an integrity test assembly 100 in the closed and open positions, respectively. As noted above, the integrity test assembly 100 may be of similar construction as the vent assembly 62; however, the integrity test assembly 100 has a greater diameter to provide sufficient flow characters to facilitate integrity testing. Of course, the integrity test assembly 100 may also be used for aseptic venting or sampling, just like the vent assembly 62. In the embodiment shown, the integrity test assembly 100 comprises an opening or port on the filter capsule 50 having a body 108 extending from the inlet housing 54. The body 108 defines a bore 110 and comprises three sections. A first section 112 of the body 108 closest to the filter capsule 50 has a first inner diameter that is smaller than the inner diameter of a second section 116. A transition section 114 between the first section 112 and second section 116 has an inner diameter that increases linearly from the first section 112 to the second section 116. While in this embodiment the inner diameter of the transition portion increases linearly, in other embodiments the inner diameter may increase non-linearly, such as exponentially or via a step function. The body 108 further comprises a receiving notch 118 in communication with a cam slot 120. In this embodiment, the receiving notch 118 is a raised portion of the body 108 that is formed over the cam slot 120. As will be explained further below, the receiving notch 118 is configured to receive a cam, such that the cam may enter the cam slot 120.

The integrity test assembly 100 further comprises a valve that can be actuated to an open position and a closed position, thus facilitating fluid or gas transfer either into or out of the filter capsule 50. The valve comprises a plunger 128 positioned within the bore 110, creating a fluid tight seal between the body 108 and plunger 128 via one or more seals 132, 134, 136 such as O-rings. The plunger 128 has a shape corresponding to the bore 110. The plunger comprises a cam 125 (as shown in FIG. 9), which in the embodiment shown, extends radially from the plunger body and is configured to fit and track within the cam slot 120. In this embodiment, the cam 125 and cam slot 120 define the linear extent of movement of the plunger 128 within the bore 110. Rotating a connector actuator or handle 104 causes the cam 125 to traverse the cam slot 120. In this embodiment, the integrity test assembly 100 is in the closed position when the cam 125 is in a portion of the cam slot 120 closest to the inlet housing 54; similarly, the integrity test assembly 100 is in the open position when the cam 125 is in a portion of the cam slot 120 farthest from the inlet housing 54.

The plunger 128 has a diameter configured to match the configuration of the body 108. In this embodiment, the plunger 128 comprises three portions corresponding to the three sections 112, 114, 116 of the body 108. Similar to the sections of the body 108, a first portion 122 has an outer diameter that is smaller than the outer diameter of a second portion 126. A transition portion between the first portion 122 and second portion 126 has an outer diameter that is configured to match the configuration of the transition section 114 of the bore 110. For example, in this embodiment, the diameter of the transition section increases linearly from the outer diameter of the first portion 122 to the outer diameter of the second portion 126. As will be explained in further detail below, the plunger 128 acts as a valve and cooperates with the body 108 to actuate the integrity test assembly 100. During actuation of the integrity test assembly 100 to an open position, the plunger 128 traverses the bore 110 such that the first portion 122 of the plunger 128 aligns with the transition section 114 of the body 108, creating a fluidic channel in communication with the interior of the filter capsule 50. When the integrity test assembly 100 is actuated to a closed position, the plunger 128 traverses the bore 110 such that the first portion 122 of the plunger 128 aligns with the first section 112 of the body 108, thus closing the fluid channel.

Further, in this embodiment, the plunger 128 comprises one or more cavities 142. The cavities 142 help to reduce friction during translation of the plunger 128 within the bore 110. In certain embodiments, the cavities 142 may be larger, smaller, have different shapes, or not be present.

Various seals are arranged along the length of the plunger 128 to form a fluid tight seal between various portions of the plunger 128 and the body 108. In this embodiment, the integrity test assembly 100 includes three seals: a shut-off seal 132, an outside seal 134, and a sterility seal 136. As shown, the seals are contained in annular grooves 138 formed in the plunger 128. In various embodiments, the seals 132, 134, 136 may be O-rings, either pre-formed and retained within the annular grooves 138, or formed in place in the annular grooves 138. However, if desired, different configurations of seals and their placements can be used. For example, seals may be held in grooves in the inner surface of the bore 110.

Within the plunger 128 is an axial channel 130, which is in communication with the connection 102. The axial channel 130 is further in communication with a radial channel 144 located between the shut-off seal 132 and outside seal 134. In this embodiment, the axial channel 130 and radial channel 144 together form a T-shaped fluidic channel that may be used to transfer fluid, gas, or other substances into or out of the filter capsule 50 when the integrity test assembly 100 is actuated to an open position.

In the closed position (as shown in FIG. 7), the radial channel 144 is not in communication with the interior of the filter capsule 50 due to the shut-off seal 132 being in contact with the first section 112 of the body 108, and fluid within the filter capsule 50 is contained. In this position, the sections 112, 114, 116 of the body 108 are respectively aligned with the corresponding portions 122, 124, 126 of the plunger 128. Rotating the connector actuator or handle 104 urges the cam 125 along the cam slot 120, causing the plunger 128 to move towards an open position (as shown in FIG. 8). In the open position, the plunger 128 has moved laterally away from the filter capsule 50 such that the first portion 122 of the plunger 128 is aligned with the transition section 114 of the body 108. This creates an open space between the shut-off seal 132 and transition section 114, thus forming a fluidic connection between the contents of the filter capsule 50 and the radial channel 144. Thus, fluid within the filter capsule 50 may exit through the created open space, into the radial channel 144, into the axial channel 130, and out through the connection 102. Similarly, a gas or fluid may be provided to the filter capsule 50 along the same path. To enter the closed position and re-establish a seal between the shut-off seal 132 and first inner section 112, the connector actuator or handle 104 is rotated in the opposite direction.

To use the integrity test assembly 100 for venting or sampling, tubing and a venting or sampling container such as a bag are aseptically connected to the connection 102. The integrity test assembly 100 is then actuated to the open position by rotating the connector actuator or handle 104. The contents of the filter capsule 50 may then traverse the radial channel 144 and axial channel 130, exiting via the connection 102. Once venting or sampling is complete, the integrity test assembly 100 is actuated to the closed position, and the tubing and venting or sampling container is removed. The vent assembly 62 may be used in a similar manner. Once venting or sampling is complete, the integrity test assembly 100 may then enter the closed position by appropriately actuating the connector actuator or handle 104. This may be accomplished by rotating the connector actuator or handle 104 in the opposite direction, thus placing the shut-off seal 132 back into contact with the surface of the bore 110 at the first section 112 and reestablishing the liquid-tight seal between the plunger 128 and bore 110 (as shown in FIG. 7).

The integrity testing assembly 100 provides numerous advantages for testing the integrity of the filter element 40 when compared to previous approaches. If pre-filtration integrity testing is desired, a gas line or other integrity testing hardware is aseptically attached to the connection 102. The integrity test assembly 100 is then actuated to an open position, creating an aseptic fluid connection between the integrity testing hardware and contents of the filter capsule 50. The gas line or integrity testing hardware is then activated, thus pressurizing the contents of the filter capsule 50. To perform a diffusion test, the resulting increase in pressure downstream is measured and compared to known values for the filter element. To perform a pressure drop test, the decrease in pressure over time upstream of the filter element is similarly measured and compared to known values. If the filter meets the known values, it can be safely assumed that the filter element is not compromised.

The integrity test assembly 100 may then be actuated to a closed position, and the gas line or integrity testing hardware may be removed without compromising the process stream. Once the filtration process is complete, this process may be repeated to determine whether the filter was compromised during filtration, and thus whether the resulting filtrate is sterile. Despite multiple actuations and multiple rounds of integrity testing, the integrity test assembly 100 remains aseptic and prevents contamination of the process stream. Further in contrast to the prior art, the use of a filter capsule 50 with an integrated integrity test assembly 100 results in the advantage that no additional components for integrity testing are required upstream of the filter capsule 50. Each of these additional components represented an additional failure or contamination point. Further, these additional components did not ensure sterility through multiple actuations or rounds of integrity testing. In contrast, the present disclosure features an integral integrity test connection that maintains sterility despite multiple actuations, and is located directly at the filter capsule itself, the desired point of interest.

Figure 9A:
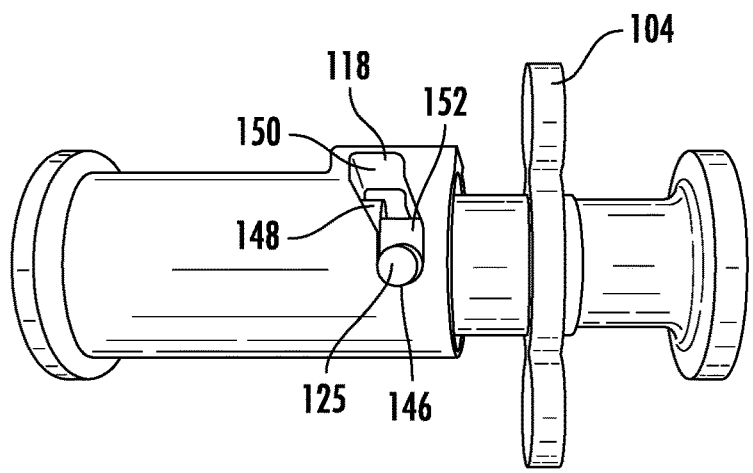
FIGS. 9A-C are side views of the exterior of an integrity test assembly as it transitions from an open position to a closed position.
Figure 9B:
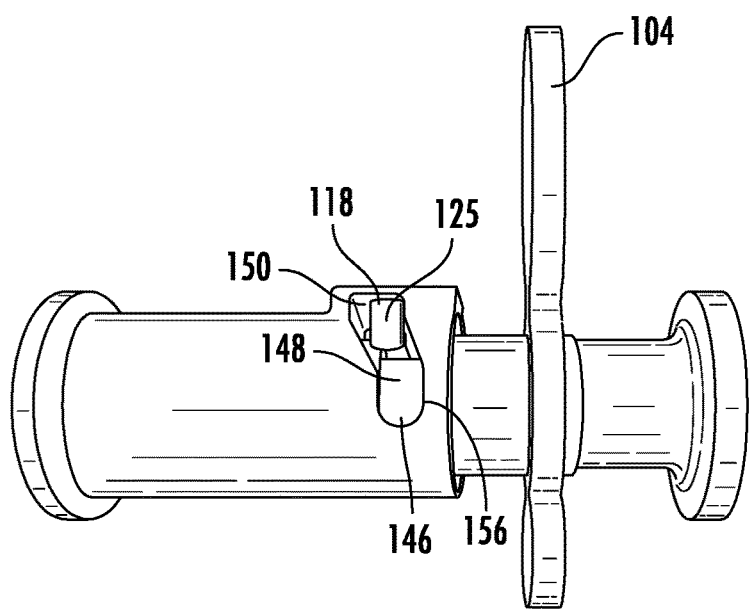
Figure 9C:
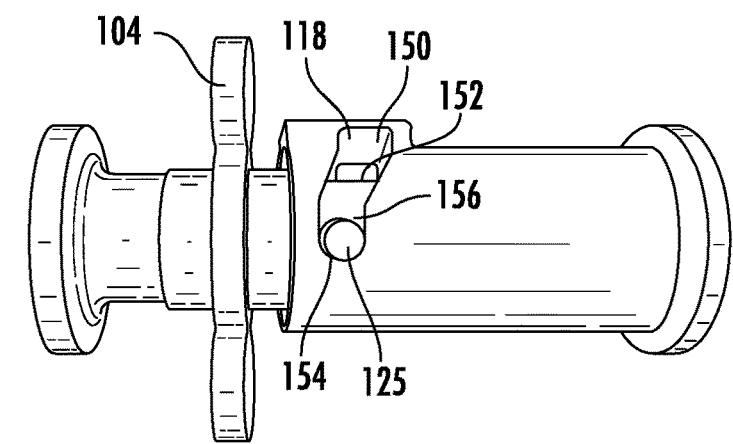

FIGS. 9A-C are side views of an embodiment of an integrity test assembly 100, illustrating the cam slot 120 in further detail. FIG. 9A illustrates the integrity test assembly 100 in an open position. As previously described, in the open position, the transition portion 124 of the plunger 128 is aligned with the first section 112 of the body 108. In this embodiment, the cam slot 120 comprises five segments: an open segment 146, first transition segment 148, receiving segment 150, second transition segment 152, and closed segment 154. In the open position, the cam 125 is located in the open segment 146 of the cam slot 120. The open segment 146 is sized to accommodate the cam 125, and has a slope perpendicular to the longitudinal axis of the plunger 128. Thus, as the cam 125 traverses the open segment 146, its position along the longitudinal axis of the body 108 does not change. This feature is useful because it enables the integrity test assembly 100 to enter the open position prior to the cam 125 reaching the end of the cam slot 120, thus ensuring that the integrity test assembly 100 is fully opened, but allowing for additional rotation of the handle 104 after entering the open position. Further, the open segment 146 may comprise a detent 156 slowing movement of the cam 125 within the open segment 146, providing tactile feedback to an end user that the integrity test assembly 100 has entered the open position.

To begin closing the valve, the connector actuator or handle 104 is rotated, causing the cam 125 to enter the first transition segment 148. The first transition segment 148 has a path that is sloped towards the filter capsule 50. As the cam 125 traverses the first transition segment 148, the plunger 128 begins to enter the closed position, such that the transition portion 124 of the plunger 128 begins to align with the first section 112 of the body 108. As shown in FIG. 9B, continuing to rotate the handle 104 causes the cam 125 to then enter the receiving segment 150. Halfway between the open and closed positions, the receiving segment 150 is in communication with the receiving notch 118. Thus, when the plunger 128 is first positioned within the bore 110 (e.g., during manufacture of the filter capsule 50), the cam 125 is in the receiving segment 150. Like the open segment 146, the receiving segment 150 has a slope perpendicular to the longitudinal axis of the plunger 128 such that the plunger 128 does not move towards or away from the filter capsule 50 as the cam 125 traverses the receiving segment 150. Thus, an end user may slightly rotate the handle 104 without causing the plunger 128 to move towards the open or closed positions, providing a finer degree of control.

Continuing to rotate the connector actuator or handle 104 causes the cam 125 to enter the second transition segment 152. Like the first transition segment 148, the second transition segment 152 has a path that is sloped towards the filter capsule 50. As shown in FIG. 9C, the second transition segment 152 is connected to the closed segment 154. Like the open segment 146 and receiving segment 150, the closed segment 154 has a slope perpendicular to the longitudinal axis of the plunger 128 such that the plunger 128 does not move towards or away from the filter capsule 50 as the cam 125 traverses the closed segment 154. Similarly, this feature is useful because it enables the integrity test assembly 100 to enter the closed position prior to the cam 125 reaching the end of the cam slot 120, thus ensuring that the integrity test assembly 100 is fully closed and allowing additional rotation of the handle 104 after entering the closed position. Further, the closed segment 154 may also comprise a detent 156 slowing movement of the cam 125 within the closed segment 154, providing tactile feedback to an end user that the integrity test assembly 100 has entered the closed position. The combination of detent 156 and additional rotation without exiting the closed position is particularly useful because it minimizes inadvertent opening (and the potential for contamination) of the integrity test assembly 100.

In certain embodiments, additional cams and cam slots may be used. For example, in certain embodiments, an integrity test assembly 100 comprises a pair of cams within cam slots disposed 180 degrees from one another along the body of an integrity test assembly. In certain embodiments, cam slots may be longer or shorter depending on the level of actuation desired per rotation of a connector actuator or handle. In certain embodiments, a plunger may enter the closed or open positions only on reaching a respective end of a cam slot. Various embodiments are considered to be within the scope of the disclosure.

Figure 10A:
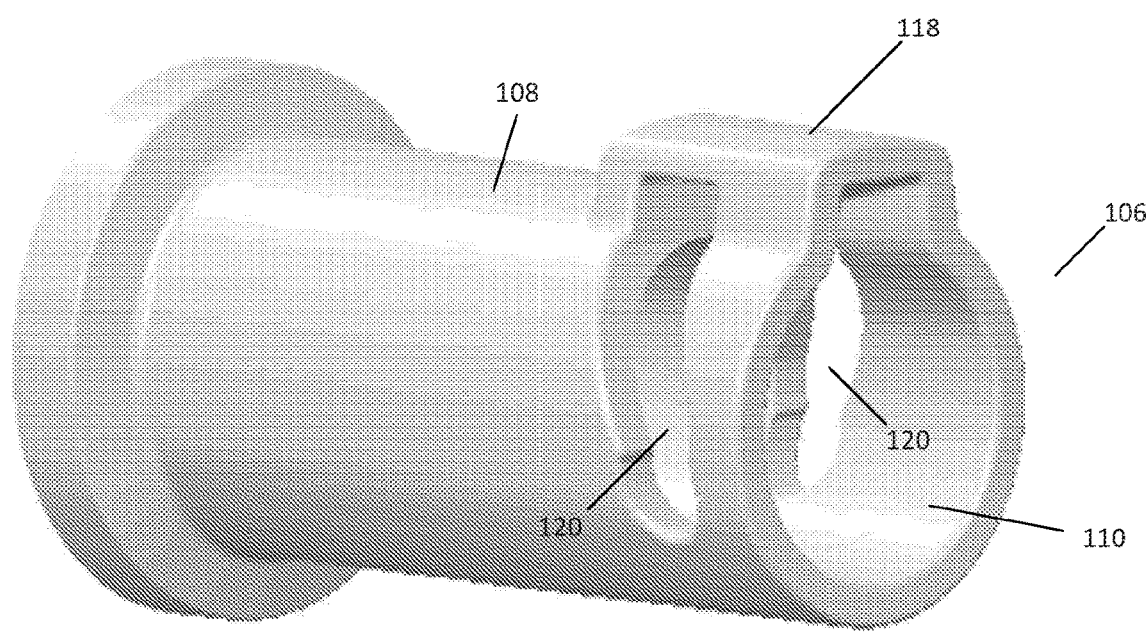
FIG. 10A-B are perspectives views of the body and plunger of the integrity test assembly of FIGS. 7-8.
Figure 10B:
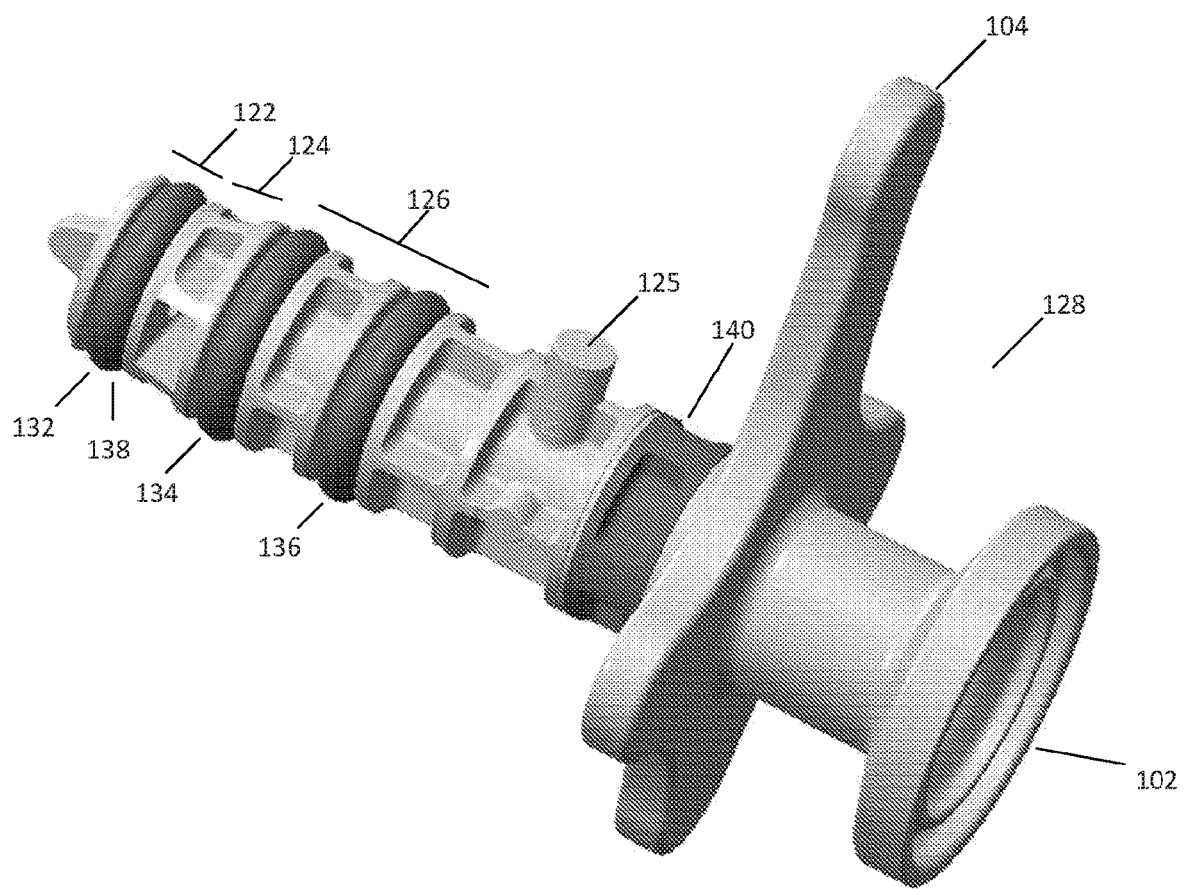

FIG. 10 is a perspective view illustrating the integrity test assembly 100 with the plunger 128 separated from the bore 110. In this embodiment, the plunger 128 is a molded plastic component formed of polyethersulfone, a relatively strong material that helps make the integrity test assembly 100 robust and less susceptible to bending, breaking, melting, or other modes of failure. The plunger 128 contains annular grooves 138 in which the seals 132, 134, 136 are placed. The shut-off seal 132 is located in the first portion 122, whereas the outside seal 134 and sterility seal 136 are located in the second portion 126. As previously noted, the transition portion 124 has a diameter that transitions linearly between that of the first portion 122 and second portion 126. However, in other embodiments, the transition portion 124 may transition in a different manner or be absent from the plunger 128. Further, the plunger 128 includes a cam 125 and an indicator strip 140.

To build the integrity test assembly 100, the plunger 128 is inserted into the bore 110 such that the cam 125 enters the receiving notch 118. Rotating the handle 104 about the longitudinal axis of the integrity test assembly 100 causes the cam 125 to follow the path of the cam slot 120, thus limiting the length of travel of the plunger 128 within the bore 110. As described above, in this embodiment the cam slot 120 comprises a single cam slot 120 having multiple segments extending about the diameter of the body 108. However, in certain embodiments, the cam slot 120 may comprises two cam slots on each side of the body 108. Additionally, the use of the receiving notch 118 is beneficial because it allows for an elongated cam 125 that may extend through and protrude from the cam slot 120, preventing accidental slippage of the cam 125 out of the cam slot 120 and into the bore 110.

An indicator strip 140 is another useful feature that readily indicates to an end user whether the plunger 128 is in either the open or closed positions. In this embodiment, the indicator strip 140 is placed on the plunger 128 such that it is visible only when the integrity test assembly 100 is in the open position, placing the portion of the plunger 128 having the indicator strip 140 outside of the bore 110. Thus, an end user may view the indicator strip 140 and understand that the integrity test assembly 100 is in the open position. Similarly, an end user may understand that an inability to view the indicator strip 140 means that the integrity test assembly 100 is closed.

Figure 11:
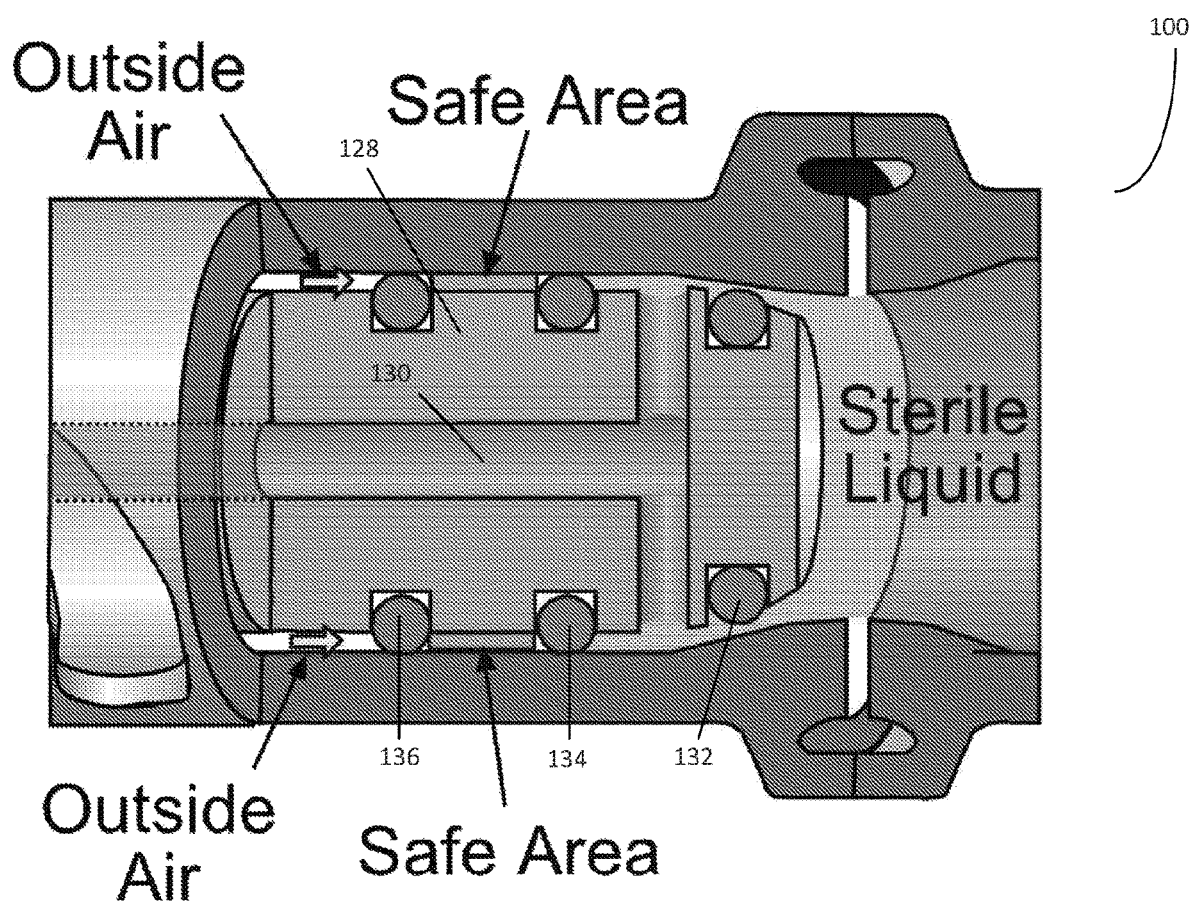
FIG. 11 is a cross-sectional view of the integrity test assembly of FIGS. 7-8.

FIG. 11 is a cross-sectional view of an integrity test assembly 100 in the open position and highlights the benefits of the use of the outside seal 134 and sterility seal 136. In the open position, sterile liquid within the filter capsule 50 may flow past the shut-off seal 132, into the radial channel 144, through the axial channel 130, and out of the integrity test assembly 100 via the connection 102. Typically, outside air and external contaminants are prevented from coming into contact with the sterile liquid by the outside seal 134. However, after multiple actuations, some contamination may pass the outside seal 134 as the plunger 128 rides within the bore 110. The provision of the sterility seal 136 as an additional seal upstream of the outside seal 134 prevents this form of contamination by defining a "safe area" between the outside seal 134 and sterility seal 136 in which the sterility seal 136 may ride, but the outside seal 134 never comes into contact. Thus, the outside seal 134 never comes into contact with a surface touched by the sterility seal 136, and therefore is less likely to experience contamination. This features helps ensure that the integrity test assembly 100 (and if desired, vent assembly 62) provide an aseptic connection to the contents of the filter capsule 50. Further, compared to the vent valves 18 of previous filter capsules 16, this feature provides the integrity test assembly 100 and vent assembly 62 to remain aseptic despite repeated actuations.

As noted above, this aseptic property allows the integrity test assembly 100 to be used for a variety of purposes. For example, the integrity test assembly 100 may be used for venting of built-up gas within the filter capsule 50. Alternately, the integrity test assembly 100 may be used for sampling of media within the filter capsule 50. For both of these purposes, the integrity test assembly 100 ensures that despite multiple actuations, the contents of the filter capsule remain sterile and not exposed to the outside environment. Further, the integrity test assembly 100 may function as a valve, allowing for an integrity test connection that can be removed from the filter capsule 50 without compromising product sterility. Providing an integrity test assembly 100 directly on the filter capsule 50 greatly simplifies the design of an assembly, as the need to set up a connection upstream for integrity testing hardware is eliminated. Further, the use of a sterility seal 136 in both the vent assembly 62 and integrity test assembly 100 helps to ensure an aseptic connection, thus reducing the risk of product and environmental contamination.

In certain embodiments, the integrity test assembly 100 may be a removable, replaceable, or single-use component. For example, rather than being molded directly to the inlet housing 54, the integrity test assembly 100 may include a sanitary flange that may be mated to a corresponding port on the filter capsule 50.

Figure 12:
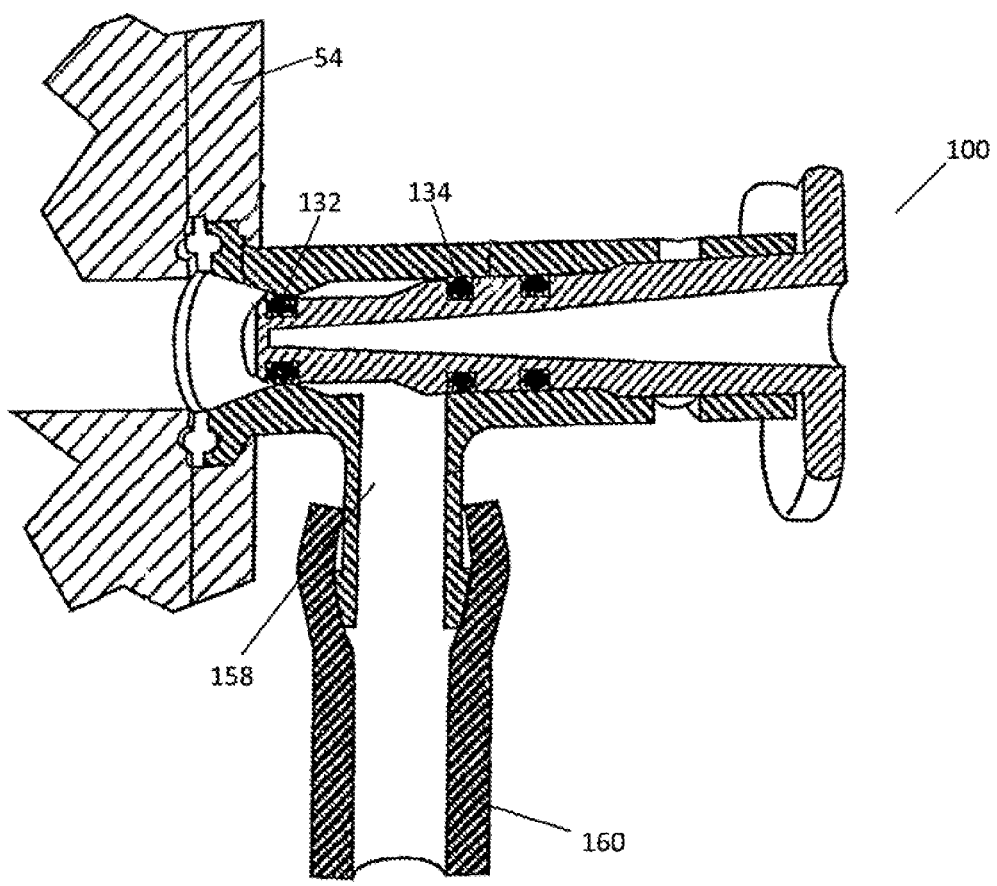
FIG. 12 is a cross-sectional view of an integrity test assembly according to another embodiment of the disclosure.

In certain embodiments, the axial channel 130 and/or radial channel 144 may be formed in a separate element, as opposed to within the plunger 128. For example, as shown in the embodiment of FIG. 12, the bore 110 may include an auxiliary port 158 located between the shut-off seal 132 and outside seal 134. Tubing 160 or the like is then connected to the auxiliary port 158. Actuating the integrity test assembly 100 then allows fluid to flow past the shut-off seal 132 and out the auxiliary port to a downstream component or other device, or alternately to be used as a connection for integrity testing. In certain embodiments, the radial channel 144 and axial channel 130 may comprise a single fluid channel. In certain embodiments, multiple channels may be used to create a fluidic connection between the interior of the filter capsule 50 and the connection 102.

As described above, seals may be mounted on the plunger 128. However, if desired, different configurations of seals and their placements can be used. For example, at least some seals may be held in grooves of the bore 110 as opposed to the plunger 128. In another embodiment, the outside seal 134 and sterility seal 136 may be replaced with a single linear or gland seal that covers a similar distance between the outside seal 134 and sterility seal 136, such that one end of the seal never comes into contact with a surface of the bore 110 in contact with the other end of the seal.

In the disclosed embodiments above, the integrity test assembly 100 is formed of a plastic material including polyethersulfone. The integrity test assembly 100 may be formed by machining the body 108 and plunger 128 and then applying the necessary seals and the like, or preferably by molding the body 108 and the plunger 128 separately and assembling them together with the necessary seals and other components. The integrity test assembly 100 may be made of a variety of plastic materials. For example, in the embodiment disclosed, the inlet housing 54 and body 108 are formed from polypropylene. However, the plunger 128 is formed from polyethersulfone, which results in a plunger 128 that is stronger and having better dimensional stability. However, a variety of materials may be used for any of these components. Similarly, other components of the filter capsule 50 may comprise a variety of materials.

Further, it should be noted that various features of the above embodiments and disclosure may be combined with one another to form various filter assemblies, capsules, and ports. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A filter capsule that supports direct integrity testing of an internal filter element, comprising:
   a filter housing comprising an inlet port, an outlet port spaced from the inlet port, a housing volume between the inlet port and the outlet port and containing a filter element, a vent assembly, and an integrity test assembly integral to said filter capsule providing a direct aseptic connection to said filter element, wherein said integrity test assembly comprises a port on the filter housing and a valve configured to connect to integrity testing hardware positioned in said port on the filter housing.

2. The filter capsule of claim 1, wherein the vent assembly and integrity test assembly are aseptic.

3. The filter capsule of claim 1, wherein a fluid passes from the inlet port to the outlet port through the filter element, and the integrity test assembly is located on an upstream side of the filter element.

4. The filter capsule of claim 1, further comprising a first handle protecting the integrity test assembly from accidental contact, and a second handle protecting the vent assembly from accidental contact.

5. The filter capsule of claim 1, further comprising feet.

6. The filter capsule of claim 1, wherein the integrity test assembly comprises:
   a body having a bore formed through at least a portion of its interior, the bore including a cam slot;
   a movable plunger positioned within the bore, the plunger having a shape corresponding to that of the bore, the movable plunger further comprising:
      an outer surface;
      a cam formed on the outer surface and contained within the cam slot; and
      an actuator to move the plunger within the bore between a closed position and an open position;
   one or more seals between the plunger and the body to form a liquid fluid tight seal between various portions of the plunger and the body;
   wherein the cam remains within the cam slot as the plunger moves between the closed position and the open position.

7. The filter capsule of claim 6, wherein the one or more seals are arranged along the outer surface of the plunger to form a liquid fluid tight seal between various portions of the plunger and the body.

8. The filter capsule of claim 6, wherein the seals comprise O-rings.

9. The filter capsule of claim 6, wherein the plunger further comprises a fluid channel in fluid communication with a passage of the filter capsule when the plunger is in the open position.

10. The filter capsule of claim 6, wherein the one or more seals comprise a shut-off seal, an outside seal, and a sterility seal.

11. The filter capsule of claim 10, wherein the outside seal and the sterility seal are arranged along the outer surface of the plunger such that the portion of body in contact with the outside seal never comes into contact with the sterility seal as the plunger moves between the closed position and the open position.

12. The filter capsule of claim 10, wherein the outside seal and the sterility seal comprise a single seal.

13. The filter capsule of claim 6, wherein the body has a first section having a first inner diameter, a second section having a second inner diameter greater than the first inner diameter, and a transition section between the first and second sections having a tapering inner diameter along its length from the first section to the second section which is a progression of the difference in diameters between the first inner diameter and the second inner diameter.

14. The filter capsule of claim 13, wherein the progression of the difference in diameters is a linear progression.

15. The filter capsule of claim 6, further comprising an indicator strip on the integrity test assembly.

16. The filter capsule of claim 15, wherein the indicator strip is located on the plunger.

17. A system for integrity testing a single-use filtration assembly, comprising:
   an integrity testing device;
   a source of a fluid to be processed;
   a holding container; and
   a filtration device, said filtration device comprising an inlet port in fluid communication with said source of fluid to be processed, an outlet port in fluid communication with said holding container, a filter element, an aseptic vent assembly, and an aseptic integrity test assembly, said integrity test assembly being integral to said filtration device providing a direct aseptic connection to said filter element and comprising:
   a body having a bore formed through at least a portion of its interior;
   a plunger contained within the bore, the plunger having a shape corresponding to that of the bore;
   an actuator to move said plunger between a closed position and an open position;
   a shut-off seal, an outside seal, and a sterility seal; wherein said integrity testing device is attached to said integrity test assembly to facilitate integrity testing of said filter element.

18. A method of performing an integrity test of a filter element through a port of a filter capsule, comprising:
   attaching a gas line to an integrity test assembly that is integral to said filter capsule providing a direct aseptic connection to said filter element, said integrity test assembly comprising a port and a valve providing fluid communication to an interior of the filter capsule;
   actuating the integrity test assembly to an open position;
   pressurizing the filter capsule using the gas line;
   measuring a resulting pressure change; and
   determining whether the measured pressure change indicates that a filter within the filter capsule has been compromised.

19. The method of claim 18, further comprising:
   actuating the integrity test assembly to a closed position;
   after actuating the integrity test assembly to a closed position, using the filter capsule to filter a product;
   after using the filter capsule to filter a product:
   actuating the integrity test assembly to the open position;
   pressurizing the filter capsule using the gas line;
   measuring a second resulting pressure change; and
   determining whether the second measured pressure change indicates that the filter within the filter capsule has been compromised after using the filter capsule to filter a product; wherein the integrity test assembly remains aseptic after each actuation.

20. The method of claim 18, wherein said pressure change is measured upstream of the filter element.

* * * * *